US011466558B2

(12) United States Patent
Wang et al.

(10) Patent No.: US 11,466,558 B2
(45) Date of Patent: Oct. 11, 2022

(54) INVERSION-BASED ARRAY PROCESSING FOR CEMENT-BOND EVALUATION WITH AN LWD TOOL

(71) Applicant: Halliburton Energy Services, Inc., Houston, TX (US)

(72) Inventors: Ruijia Wang, Singapore (SG); Wei-Bin Ewe, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 288 days.

(21) Appl. No.: 16/905,277

(22) Filed: Jun. 18, 2020

(65) Prior Publication Data

US 2021/0396125 A1   Dec. 23, 2021

(51) Int. Cl.
| | | |
|---|---|---|
| *E21B 47/005* | (2012.01) | |
| *G01V 1/44* | (2006.01) | |
| *E21B 47/107* | (2012.01) | |
| *G01V 1/28* | (2006.01) | |
| *G01V 1/30* | (2006.01) | |
| *G10L 25/51* | (2013.01) | |
| *G01V 1/46* | (2006.01) | |

(52) U.S. Cl.
CPC .............. *E21B 47/005* (2020.05); *G01V 1/44* (2013.01); *G01V 1/46* (2013.01); *G10L 25/51* (2013.01); *E21B 2200/20* (2020.05)

(58) Field of Classification Search
None
See application file for complete search history.

(56) References Cited

U.S. PATENT DOCUMENTS

| 5,214,251 | A | 5/1993 | Orban et al. |
|---|---|---|---|
| 10,539,698 | B2 * | 1/2020 | Pistre .................... E21B 47/005 |
| 2003/0018433 | A1 | 1/2003 | Blanch et al. |
| 2003/0174581 | A1 | 9/2003 | Parra et al. |
| 2006/0070433 | A1 | 7/2006 | Fredette et al. |

(Continued)

FOREIGN PATENT DOCUMENTS

| AU | 2014307021 A1 * | 2/2016 | ............. E21B 47/00 |
|---|---|---|---|
| EP | 3179277 A1 * | 6/2017 | ......... E21B 47/0005 |

(Continued)

OTHER PUBLICATIONS

Grosmangin, M., P.P. Kokesh, and Pd Majani. "A sonic method for analyzing the quality of cementation of borehole casings." Journal of Petroleum Technology 13.02 (1961): 165-171.

(Continued)

*Primary Examiner* — Curtis A Kuntz
*Assistant Examiner* — Jerold B Murphy
(74) *Attorney, Agent, or Firm* — Kilpatrick Townsend & Stockton LLP

(57) ABSTRACT

Logging of data by a downhole tool disposed in a borehole may be affected by tool wave effects. The tool waves appear in the first echo of casing wave arrivals and the amplitudes may be much larger than casing wave arrivals. The estimates of casing wave amplitude are biased due to these tool wave arrivals when using conventional cement-bond logging (CBL) processing. An automated adaptive inversion-based array processing for CBL evaluation using a downhole tool provides an improvement in the calculation of a bonding index.

20 Claims, 9 Drawing Sheets

(56) References Cited

U.S. PATENT DOCUMENTS

| | | | |
|---|---|---|---|
| 2014/0043938 A1* | 2/2014 | Sinha | G01V 1/50 367/31 |
| 2014/0236357 A1* | 8/2014 | Degrange | E21B 47/26 700/275 |
| 2015/0168581 A1 | 6/2015 | Izuhara et al. | |
| 2017/0226844 A1* | 8/2017 | Izuhara | E21B 47/005 |
| 2017/0350231 A1 | 12/2017 | Merciu | |
| 2018/0045031 A1* | 2/2018 | Shaposhnikov | E21B 47/005 |
| 2018/0284308 A1 | 10/2018 | Hirabayashi | |
| 2019/0017369 A1 | 1/2019 | Ameen | |
| 2019/0369285 A1 | 12/2019 | Fouda et al. | |
| 2020/0072036 A1* | 3/2020 | Wang | G01N 29/046 |
| 2020/0116007 A1 | 4/2020 | Mandal | |
| 2021/0396126 A1* | 12/2021 | Wang | E21B 47/005 |

FOREIGN PATENT DOCUMENTS

| | | | |
|---|---|---|---|
| EP | 3179277 A1 | 6/2017 | |
| WO | 2004/057372 A1 | 7/2004 | |
| WO | 2016/187242 A1 | 11/2016 | |
| WO | WO-2018183246 A1 * | 10/2018 | E21B 47/047 |
| WO | 2020/047459 A1 | 3/2020 | |
| WO | 2020/149826 A1 | 7/2020 | |

OTHER PUBLICATIONS

Kinoshita, Toshihiro, et al. "Feasibility and challenge of quantitative cement evaluation with LWD sonic." SPE Annual Technical Conference and Exhibition. Society of Petroleum Engineers, 2013.

Pistre, Vivian, et al. "Attenuation-Based Quantitative Cement Bond Index with LWD Sonic: A Novel Approach Applicable to all Casing and Cement Cases." SPE Annual Technical Conference and Exhibition. Society of Petroleum Engineers, 2014.

Izuhara, W., et al. "Full-range quantitative cement bond evaluation with LWD sonic: The right way of approach using a hybrid of amplitude and attenuation." SPE Annual Technical Conference and Exhibition. Society of Petroleum Engineers, 2017.

Tang, Xiaoming, Yuanda Su, and Bo Zhang. "A New Through-Casing Acoustic Logging Tool Using Dual-Source Transmitters." SPWLA 60th Annual Logging Symposium. Society of Petrophysicists and Well-Log Analysts, 2019.

Maslennikova, Yulia S., et al. "Spectral noise logging data processing technology." SPE Russian Oil and Gas Exploration and Production Technical Conference and Exhibition. Society of Petroleum Engineers, 2012.

Khalil, Ihab Nabil, et al. "Leak detection by temperature and noise logging." Abu Dhabi International Petroleum Conference and Exhibition. Society of Petroleum Engineers, 2012.

"Array Noise Tool (ANT)" Data Sheet, GoWellPro, found at https://static1.squarespace.com/static/5c5146db4eddecf7a88e4a5d/t/5d243a1d12c9e000010ce56d/1562655264082/WellIntegrity_ANT.pdf, Aug. 2017, 2 pages.

"Acoustic Conformance Xaminer® (ACX TM) Service" Data Sheet, Halliburton Well Assurance/Pipe Integrity, found at https://www.halliburton.com/content/dam/ps/public/lp/contents/Data_Sheets/web/H/Acoustic-Conformance-Xaminer.pdf?nav=en-US_wireline-perforating_public, Aug. 2016, 2 pages.

International Search Report and Written Opinion issued in related PCT Application No. PCT/US2021/021288 dated Jun. 25, 2021, 9 pages.

\* cited by examiner

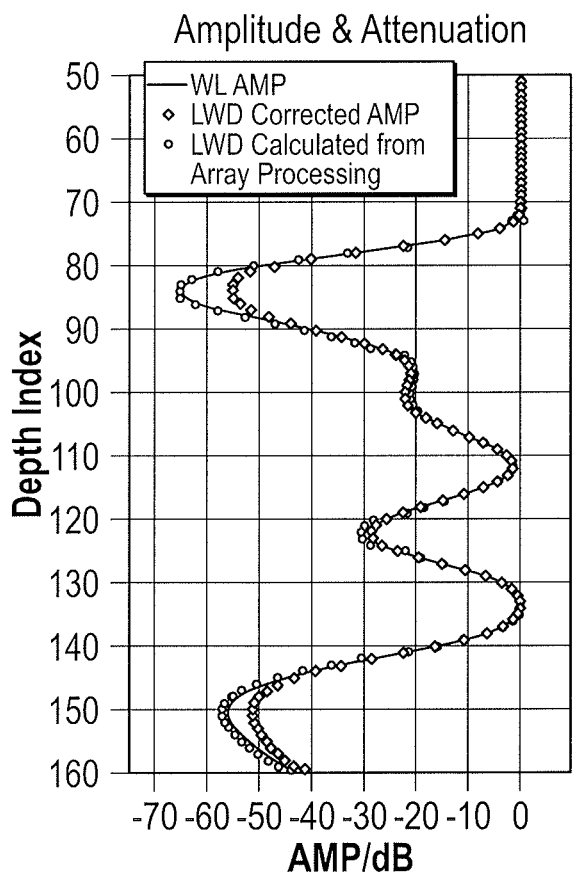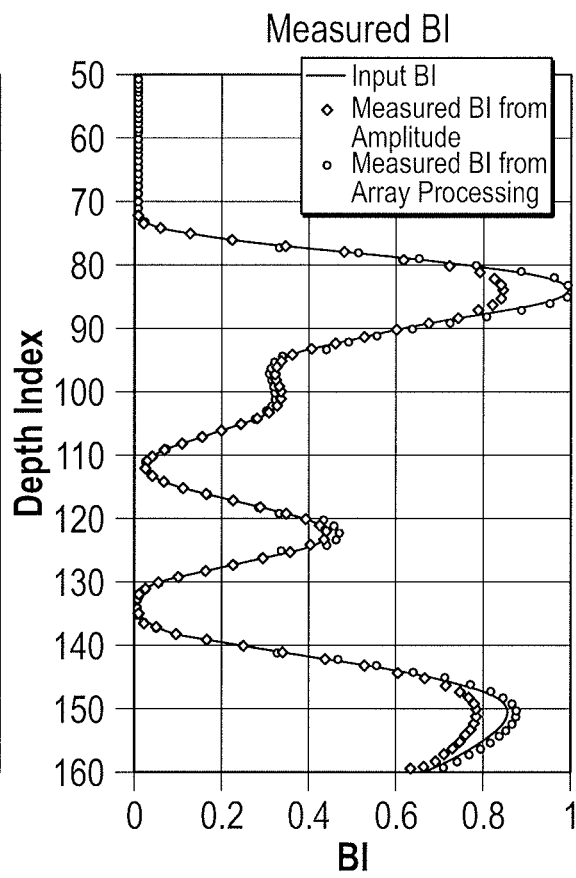
FIG. 7A
FIG. 7B

INVERSION-BASED ARRAY PROCESSING FOR CEMENT-BOND EVALUATION WITH AN LWD TOOL

BACKGROUND

The present disclosure generally relates to cement-bond evaluation and in particular to real-time processing of downhole information to accurately provide cement-bond logging evaluation solutions.

Wellbores for hydrocarbon recovery are typically cased to ensure that the integrity of a wellbore is maintained during subsequent downhole operations. The cementing process involves mixing a slurry of cement, cement additives, and water, then pumping the mix down through the casing to the annulus which is the space formed between the casing and the wall of the wellbore. Cementing adds proper support for the casing and serves as a hydraulic seal. This hydraulic seal is particularly important in achieving zonal isolation and preventing fluid migration from various zones into groundwater resources.

One physical characteristic that is used to represent the integrity of the cement in a wellbore in which a downhole tool may be disposed is the bond index (BI). BI is a qualitative measurement of cement adhesion to the exterior surface of the casing and to the wall of the borehole, where a BI value of 1.0 represents a perfect cement bond and a BI value of 0 represents no adhesion. Due to the existence of strong downhole tool waves, conventional processing methods for logging-while-drilling (LWD) sonic data may yield biased cement-bond logging (CBL) amplitude. Significant errors in estimating the BI compared to the results from a wireline sonic tool may result from the use of LWD sonic data. Such errors may affect the final decision on determining the integrity or characteristic of the cement-bond in one or more zones of the borehole. An improved real-time processing of CBL is needed to provide a more accurate determination of the integrity or characteristics of a cement-bond in casing in a borehole.

BRIEF DESCRIPTION OF THE DRAWINGS

These drawings illustrate certain aspects of some of the embodiments of the present disclosure and should not be used to limit or define the claims.

FIGS. 7A and 7B depict plots of a comparison between results of the inversion-based array processing and the amplitude-based single receiver processing for an input borehole model, assuming a 15% error in the tool wave amplitude, according to one or more aspects of the present disclosure.

Figure 1:
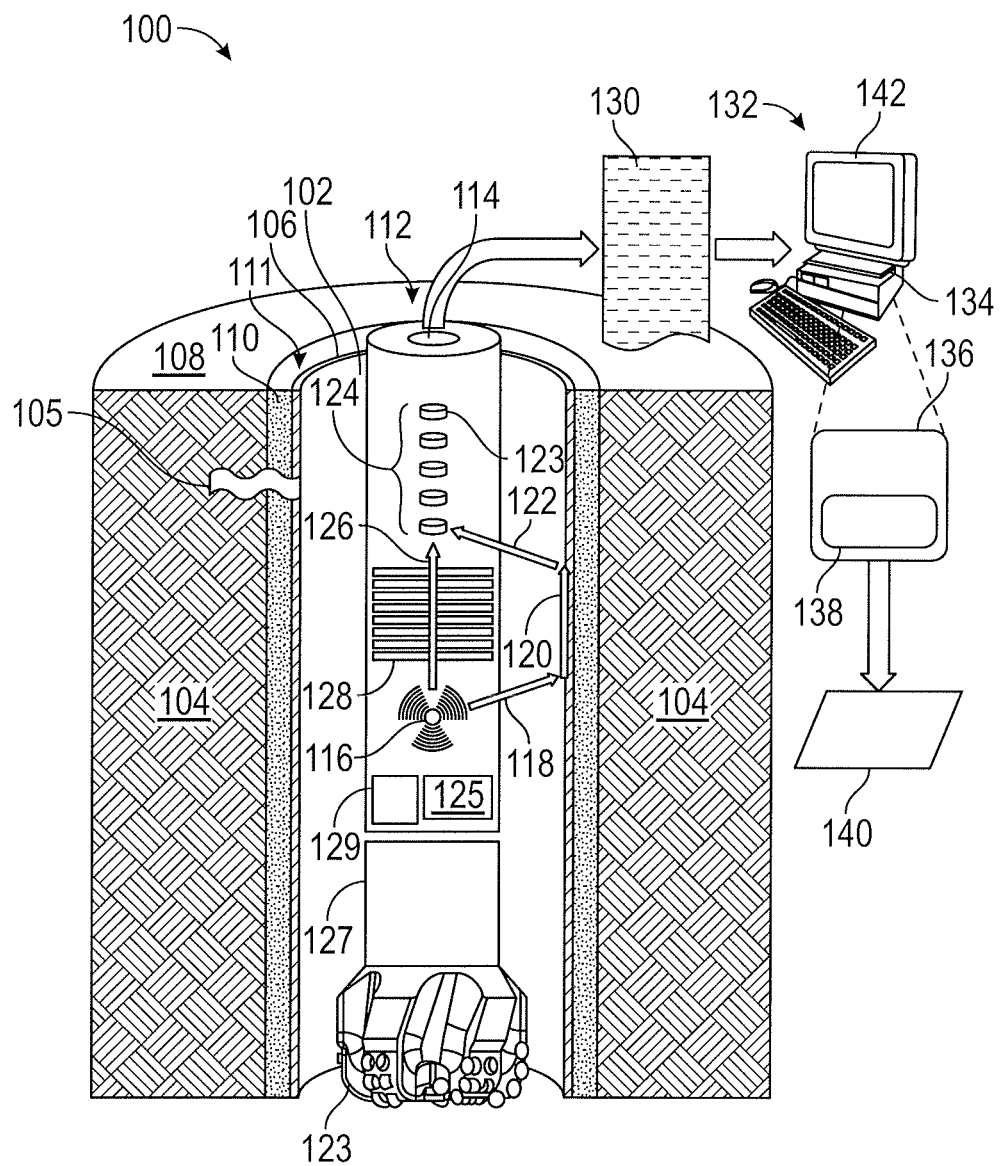
FIG. 1 depicts a partial cross-section view of an example cement-bond evaluation system, in accordance with one or more aspects of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure generally relates to evaluation of a cement-bond of a casing in a borehole where a downhole tool is disposed, for example, as part of a logging while drilling (LWD) operation.

Cement-bond logging (CBL) is a procedure in the assessment of a well that ensures integrity of a cement-bond, reduces wellbore collapse risks and verifies zonal isolation. Although various types of logging may be performed for cement-bonding analysis, sonic logging performed in a wireline operation is typically used. Sonic logging generates acoustic waves that travel from a transmitter to the wellbore and that return back to one or more receivers to obtain information in the form of acoustic wave data. Various properties of the returning waves, such as interval transit time, amplitude and phase may be assessed to obtain information about the wellbore or borehole including, but not limited to, information associated with integrity of a cement-bond.

Logging-while-drilling (LWD) sonic data in a cased wellbore or borehole may be affected by downhole tool wave effects. These downhole tool waves appear in the first echo or first acoustic responses of casing arrivals and sometimes the amplitude of the downhole tool waves may be larger than casing wave arrivals. Consequently, the estimates of casing wave amplitude are biased due to the existence of downhole tool wave arrivals if using a conventional wireline CBL processing. One approach to resolve the downhole tool effect issue is to correct the first echo or first acoustic response amplitude to gain unbiased casing wave amplitude. However, such a method is sensitive to the estimated downhole tool wave amplitude and requires user input to identify a bond zone with a 1.0 BI, and thus might only be useful in post-processing. To provide timely LWD CBL information, an automatic unattended downhole processing is desired.

According to one or more aspects of the present disclosure, known information about the downhole tool waves along with data obtained from a plurality of receivers including a multi-pole receiver is utilized. A predicted first echo or acoustic response amplitude versus offset may be generated from the known information about the downhole tool waves using a simplified casing wave-tool wave interference model. Then an inversion processing is carried out to estimate the true attenuation, amplitude or both of casing waves by minimizing the misfit between the predicted and measured first echo or acoustic response amplitude at different ones of the plurality of receivers. The constraints from the downhole tool wave amplitude may be used as inputs for removing the multi-solutions of the issue of minimizing the misfit in the inversion processing. Unlike conventional systems which require an amplitude-based method and an attenuation-based method, according to one or more aspects of the present disclosure, a single method may be utilized that can solve all types of scenarios. A simplified casing wave-tool wave interference model using an array of receivers, a workflow of inversion-based array processing for cement-bond evaluation using LWD or measurement-while-drilling (MWD) downhole tool, and constraints from downhole tool wave amplitude input for solving the multi-solution of the processing are implemented and provided to obtain an accurate, robust, competitive and efficient (in cost and time) real-time processing of data so as to generate a cement-bond index value (CBI) for LWD or MWD cement-bond logging (CBL). In one or more aspects of the present disclosure, an automated adaptive inversion-based array processing for cement-bond evaluation using a downhole tool, for example, an LWD tool, is provided. While the present disclosure discusses using downhole processing, the present disclosure contemplates post or on-site surface processing when data such as CBL data is available visually for an end user.

In one or more aspects of the present disclosure, reference may be made to a "wave". "Waves" are physical manifestations of a disturbance that transfers energy from point to point in a medium whereas "wave data" is information that may be calculated and processed. For efficiency, "wave data" will simple be referred to as "wave" or "waves" wherever appropriate, such as in operations involving data processing. Similarly, the term "echo" or "acoustic response" will be used instead of "echo data" or "acoustic response data" wherever it is appropriate to discuss processable information regarding waves that have refracted or reflected.

In one or more aspects of the present disclosure, a wellbore environment may utilize an information handling system to control one or more operations associated with the wellbore environment. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a sequential access storage device (for example, a tape drive), direct access storage device (for example, a hard disk drive or floppy disk drive), compact disk (CD), CD read-only memory (ROM) or CD-ROM, DVD, RAM, ROM, electrically erasable programmable read-only memory (EEPROM), and/or flash memory, biological memory, molecular or deoxyribonucleic acid (DNA) memory as well as communications media such wires, optical fibers, microwaves, radio waves, and other electromagnetic and/or optical carriers; and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as wellbore or borehole (interchangeably used herein) construction for river crossing tunneling and other such tunneling wellbores for near surface construction purposes or wellbore u-tube pipelines used for the transportation of fluids such as hydrocarbons. Embodiments described below with respect to one implementation are not intended to be limiting.

FIG. 1 depicts a partial cross-sectional cement-bond evaluation system 100 including a downhole tool 112 for a logging operation such as a CBL operation that includes collecting or capturing one or more cement bonding acoustic measurements, according to one or more embodiments. As depicted in FIG. 1, cement-bond evaluation system 100 comprises a borehole 102 extending through various earth strata or layers in a subterranean formation 104. The downhole tool 112 is disposed or positioned within the borehole 102. In one or more embodiments, the downhole tool 112 comprises an acoustic logging tool such as an LWD sonic tool. In one or more embodiments, downhole tool 112 comprises or is coupled to a bottom hole assembly (BHA) 127. BHA 127 is coupled to a drill bit 144. The BHA 127 operates the drill bit 144 through a drill bit motor or by rotating the entire string to drill into the subterranean formation 104. In one or more embodiments, drilling mud is forced through the interior of the drill string, and through the interior of the BHA 127. The drilling mud exits from the nozzles in the drill bit 144 and cools and lubricates the bit 123 and removes cuttings and carriers the cuttings to the surface 108 along the annulus of the borehole 102. The drilling mud may also serve as a communication medium of the telemetry to the surface 108, for example, to information handling system 132. By altering the flow of the drilling mud through the interior of the drill string, pressure pulses may be generated in the form of acoustic signals, in the column of drilling fluid. Moreover, by selectively varying the pressure pulses, signals can be generated to carry information indicative of downhole parameters, characteristics or conditions to the surface 108 for analysis.

An annular casing 106 extends from the surface 108 into subterranean formation 104. Casing 106 provides a path through which one or more fluids travel from one or more downhole locations to the surface 108. Casing 106 may comprise one or more layers. In one or more embodiments, a CBL may be recorded or measured for any one or more layers of casing 106. In one or more embodiments, during cementing, the borehole 102 may be empty or filled with a fluid, such as a drilling fluid or uncured cement. The casing 106 may be attached or coupled to a wall of the borehole 102 via cement 110 pumped down from the surface 108 between the casing 102 and the wall of the borehole 102. In one or more regions of the borehole 102, the cement 110 may not be fully adhered to the casing 106. In one or more regions of the borehole 102, the casing 106 may be completely free of cement 110 depending on the location and time that the cement 110 has had to travel up the annulus 111 between the casing 106 and the borehole 102. The interaction between one or more acoustic waves and the cement 110 around the casing 106 is used to determine the cement BI.

In one or more embodiments, downhole tool 112 comprises one or more receivers or sensors 123 and one or more transmitters or sources 116. A receiver array 124 may comprise a plurality of receivers 123. In one or more embodiments, a receiver 123 may comprise a pressure sensor, a vector hydrophone and any combination thereof. The one or more transmitters 116 transmit or generate one or more source signals (depicted with line 118) within the wellbore 102, for example, one or more acoustic signals. In one or more embodiments, one or more transmitters 116 may generate one or more source signals 118 between 20 and 50 kilohertz (kHz), lower than 20 kHz, higher than 50 kHz and any combination thereof. The transmitted one or more source signals 118 travel along the casing 106 as one or more casing waves (depicted with line 120) and consequently induce corresponding one or more acoustic responses (depicted with line 122).

The presence of cement 110 behind a first portion of the casing 106 is detected as a weak casing wave with strong attenuation. Whereas, a lack of cement 110 or less cement 110 than that behind the first portion of the casing 106 is detected as a strong or stronger casing wave with weak attenuation. The one or more receivers 123 or receiver array 124 detect or monitor for the one or more casing waves generated by the one or more transmitters 116. The one or more receivers 123 or receiver array 124 captures or collects the one or more casing waves 120 as the one or more acoustic responses 122.

One or more tool waves (depicted with line 126) act as noise that interferes with the acoustic response 122. One or more downhole tool waves 126 may comprise one or more signals, for example, one or more acoustic signals, generated by one or more transmitters 116 that travel through the downhole tool 112. One or more tool waves 126 are generated as the one or more transmitters 116 transmit one or more source signals 118 within the borehole 102. The downhole tool 112 may include a steel sonde or one or more other types of one or more isolators 128, for example a sonic or acoustic isolator, to isolate the one or more receivers 123 or receiver array 124 from being affected by the one or more tool waves 126. The one or more isolators act to suppress the one or more tool waves 126 from propagating from the one or more transmitters 116 to the one or more receivers 123 or receiver array 124. One or more isolators 128 may be comprised of various machined slots or grooves laid out in tortuous paths to attenuate the one or more tool waves 126.

However, the one or more isolators 128 may not be available in the downhole tool 112 or may be inadequate to attenuate the one or more tool waves 126 due to design limitations placed on isolators in an LWD environment which permits the one or more receivers 123 or the receiver array 124 to capture, collect or receive any one or more of the one or more tool waves 126. Also, due to the similar material of the downhole tool 112 and the drill collar or other downhole components, the one or more casing waves 120 as the one or more acoustic responses 122 and the one or more tool waves 126 may have close arrival times which allows the one or more acoustic responses 122 and the one or more tool waves 126 to appear at the first acoustic response of the one or more received signals or full waveform train. Consequently, the amplitude log, obtained from extracting the amplitude of the one or more acoustic responses 122, includes the contributions from both the one or more casing waves 120 and the one or more tool waves 126. Where the one or more tool waves 126 are equal or larger in amplitude than the one or more casing waves 120, the amplitude log is biased or mostly dominated by the one or more tool waves 126 and thus invalid for CBL evaluation. An amplitude-based correction performed to overcome this issue also may fail if the one or more tool wave signals are not well estimated from the data of a particular zones of the borehole 102 with 100% bond (or a BI of 1). However, for downhole real-time processing, it is impossible to identify such a zone and thus such amplitude-based corrections also do not provide adequate CBL evaluation. In one or more embodiments, for real-time processing, where a 100% bond zone might not be identified, a method that is not very sensitive to the error of the one or more tool waves is utilized. All data sets at different receivers are utilized so that the quality of outcome CBL logs can be improved from the utilization of additional data. Furthermore, to link the modeling data to the one or more received acoustic responses 122 better, inversion-based processing may be used to optimize the model and reduce the misfit between modeling and actual data.

In one or more embodiments, the downhole tool 112 may be a logging-while-drilling tool (LWD), a measurement-while-drilling (MWD), any other sonic tool, and any combination thereof.

Figure 9:
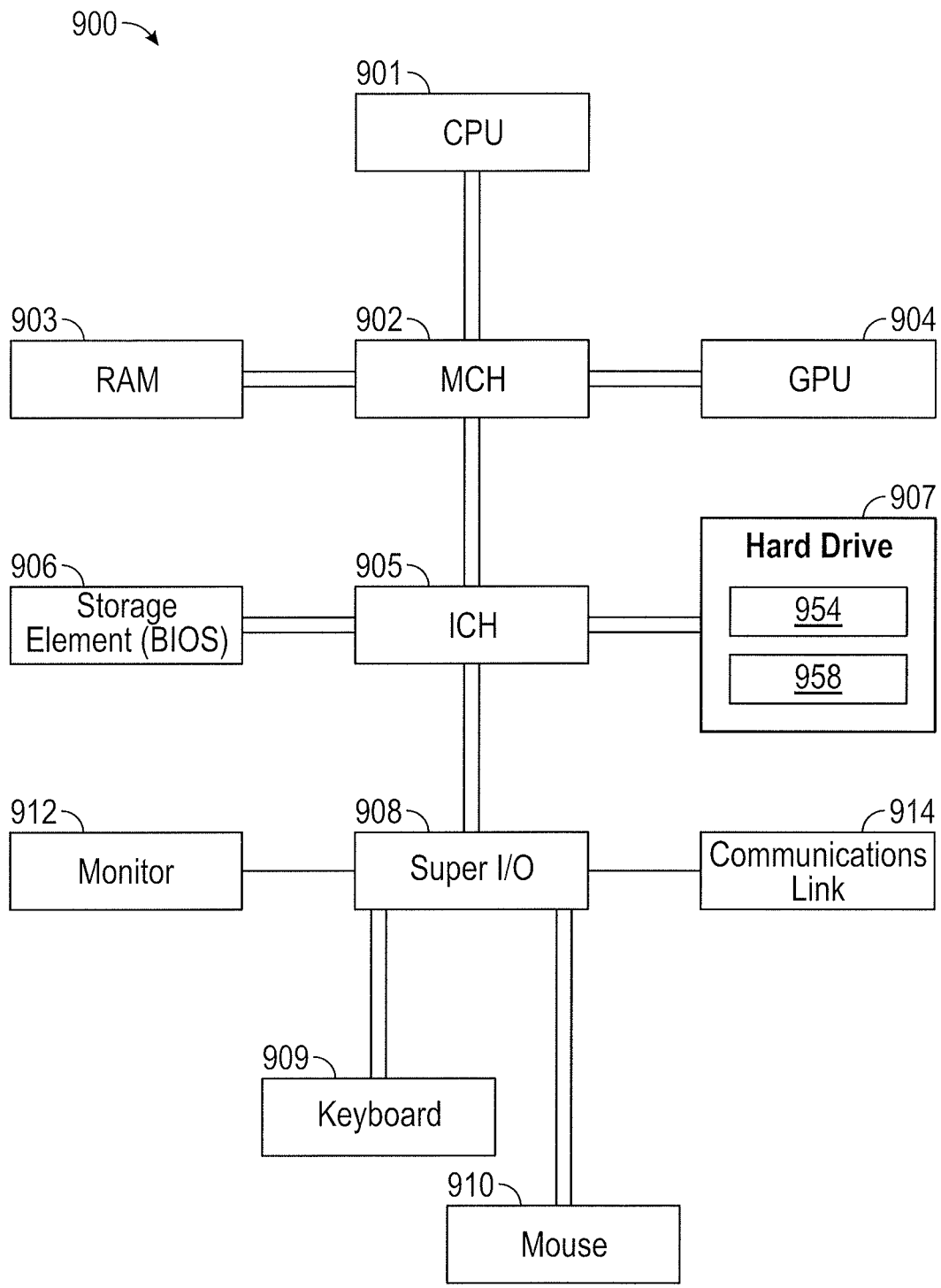
FIG. 9 is a schematic diagram of an information handling system for a wellbore environment, according to one or more aspects of the present disclosure.

In one or more embodiments, the downhole tool 112 comprises an information handling system 129 that comprises one or more processing elements, for example, any one or more elements of information handling system 900 of FIG. 9. In one or more embodiments, the downhole tool comprises a memory 125 communicatively coupled to the one or more receivers 123. In one or more embodiments, the memory 125 may be communicatively coupled to the information handling system 129 or may be part of the information handling system 129. The memory 125 may store or record data received from the one or more receivers 123. The data may comprise one or more characteristics indicative of or associated with the one or more signals received from the signal or noise source 105 or the one or more acoustic responses 122. Data 130 from the one or more receivers 123 may be communicated to the information handling system 129. The one or more characteristics may comprise a location including but not limited to azimuthal location, radial location and depth of the signal or noise source, a flow rate associated with the signal source, length of a leak associated with the signal or noise source, integrity of a cement-bond associated with the signal or noise source, any other characteristic of the signal or noise source and any combination thereof.

In one or more embodiments, the one or more receivers 123 may be communicatively coupled in lieu of or in addition to the memory 125 to an information handling system 132 at the surface 108. Information handling system 132 may be similar to or the same as the information handling system 900 of FIG. 9. Data 130 from the one or more receivers 123 may be communicated to the information handling system 132, a telemetry system, any other communication system and any combination thereof. The data 130 may be stored in a memory 903 as discussed with respect to FIG. 9. The information handling system 132 may comprise a software application or program 134 that comprises one or more instructions executable by a processor for processing or analyzing the data 130. The software application or program 134 may comprise or be communicatively coupled to one or more modules, software applications or programs, data and any other software or systems collectively referred to as computer elements 136. Computer elements 136 may comprise processed data 138 from which one or more outputs 140 are generated. The one or more outputs 140 may be displayed on the monitor 142 of the information handling system 132. While FIG. 1 illustrates an information handling system 132 located at a surface 108, the present invention contemplates that the downhole tool 112 may comprise a computing device that executes one or more instructions of a software application or program similarly or the same as the software application or program 134.

It should be noted that while FIG. 1 generally depicts a land-based system, it is to be recognized that like systems may be operated in subsea locations as well.

Figure 2:
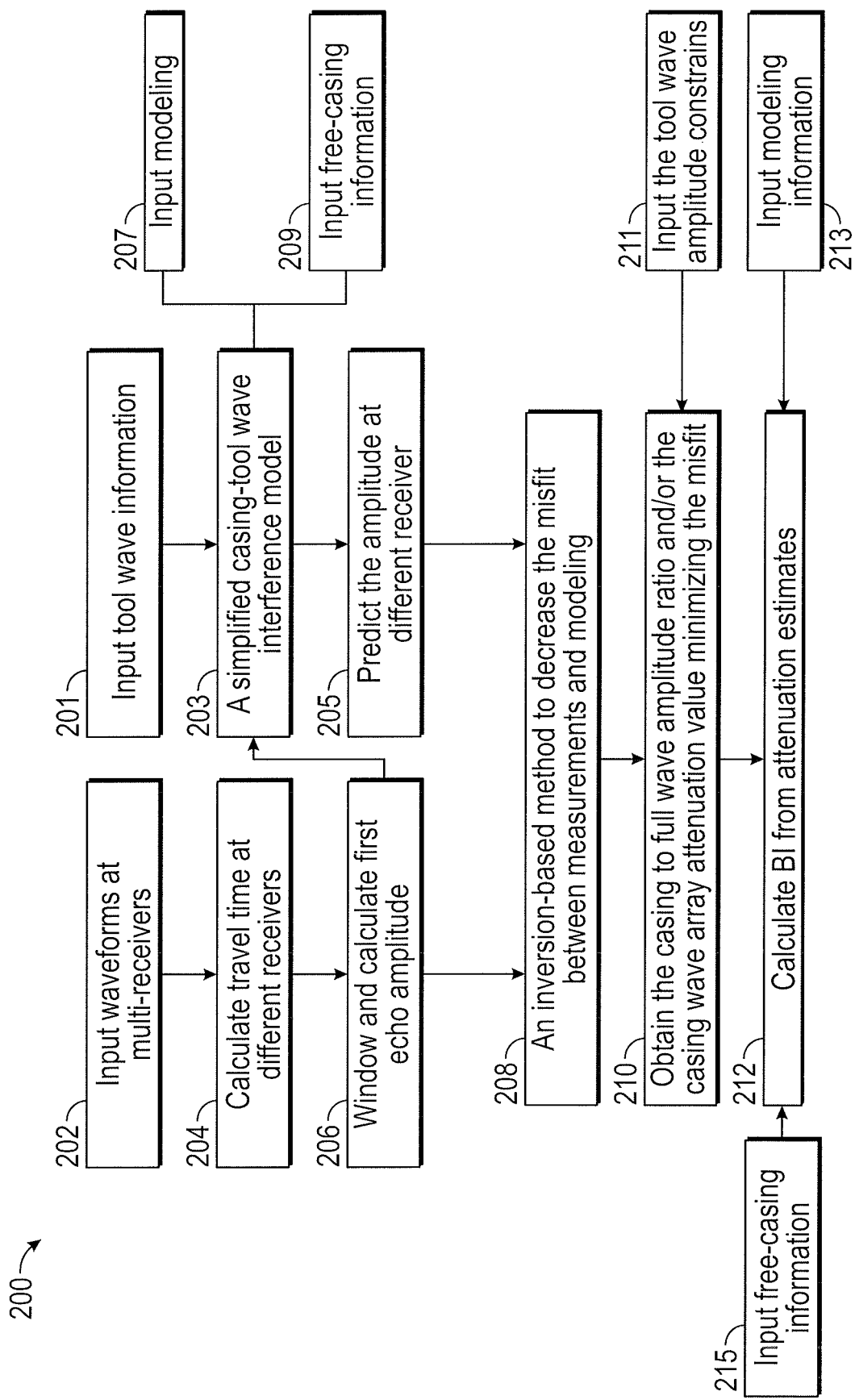
FIG. 2 is a flowchart of operations for inversion-based array processing for casing cement-bond evaluation bonding index estimation, according to one or more aspects of the present disclosure.

FIG. 2 is a flowchart of operations 200 for inversion-based array processing for cement-bond evaluation of casing 106, according to one or more aspects of the present disclosure. At step 202, one or more waves are received at a plurality of receivers, for example, receivers 123, receiver array 124 and any combination thereof. The one or more waves may comprise one or more acoustic responses 122. Information or data associated with the one or more received waves is transmitted to an information handling system, for example, information handling system 129, for processing.

At step 204, travel time of the one or more received waves at the receivers is calculated. For example, the travel time of a first acoustic response 122 at one or more or each of the plurality of receivers using one or more of one or more mud characteristics, one or more casing characteristics, and any combination thereof. For example, Equation 1 provides the travel time of the first acoustic response 122 at the one or more or each of the plurality of receivers.

$$T = 2T_{mud} + T_{casing} \quad \text{Equation 1,}$$

where T denotes the total travel time of an acoustic response 122, $T_{mud}$ denotes the delay time associated with a fluid 103 in the borehole 102, and $T_{casing}$ denotes the travel time of a casing wave 120 in a casing 106.

At step 206, a time-window may be used to capture the first measured acoustic response associated with the one or more acoustic responses 122 based, at least in part, on the calculated total travel time, T, from step 204 so as to calculate the one or more amplitudes of a first measured acoustic response 122 at different receivers of the plurality of receivers. The one or more amplitudes of the first measured acoustic response may be calculated by the peak amplitude of the first measured acoustic response 122, or the root-mean-square values of the wave data associated with the first measured acoustic response 112 in a selected window of time.

Simultaneously with or subsequent to any one or more of steps 202-206, at step 201 one or more tool wave characteristics of one or more tool waves, for example, the one or more tool waves 126 are input into a casing-tool wave interference model. The one or more tool wave characteristics or a tool wave template associated with one or more tool waves received at any one or more of the plurality of receivers may comprise one or more of amplitude, phase or both of the one or more tool waves 126. The tool wave template may comprise reference data associated with one or more tool waves 126. The tool wave template may be processed to obtain key information of the one or more tool waves 126, for example, amplitude, attenuation and slowness. The tool wave template may take measurements from an in the ground laboratory or in a water tank where no casing information exists such that only the one or more tool waves 126 are recorded. The tool wave template comprises a set of data that includes information associated with one or more tool waves. For example, a LWD sonic tool may be placed in a water tank in a ground so as to measure the one or more waves with the tool. As the water tank does not have a casing or formation, the only signals obtained are associated with the one or more tool waves. The one or more tool waves 126 may also be extracted from the well-bonded zone, where the one or more casing waves 120 are of low amplitude compared to the one or more tool waves 126. For example, in a well bond zone, a casing wave has a very large attenuation while the amplitude of the casing wave is generally very low compared to a tool wave. The data in a well-bonded zone is measured as one or more pure tool waves to obtain the tool wave template.

At step 203, the one or more tool wave characteristics of step 201, the one or more calculated amplitudes of step 206, input of the modeling information of step 207 and free-casing information of step 209 (information associated with a zone of the formation with no cement such that the casing is free of the surrounding formation) are used as inputs to a casing-tool wave interference model. For example, the free-casing information comprises an amplitude, a travel time (or phase), and a frequency of the one or more casing waves in the free-casing zone. With respect to the modeling information of step 207, assuming a bonding index from 0 and 1, with the input of the borehole, casing, or both parameters, the response from the casing wave 120 (amplitude and phase) may be determined by using a forward modeling. The forward modeling may be a numerical simulation with a real axis integration (RAI) method or a finite-difference-timedomain method. With respect to the free-casing information of step 209, the free-casing information is the amplitude of the first acoustic response data in the free casing zone. The free-casing information may be obtained by a calibration logging and processing in a free casing zone. The free-casing information is needed because the measured sonic data (all waves or signals received, recorded or otherwise obtained by the downhole tool 112) is often unitless. The free-casing data is utilized to normalize the modeling and field data so that both have the same unit. The acoustic field of the cased-borehole, for example, borehole 102, that is excited by a downhole tool 112 is very complicated and includes mode of multi-types and multi-orders, for example, of formation waves, tool waves, casing waves and cement waves.

For example, a first acoustic response of a first wave train comprises the arrival of a first one or more casing waves 120 which produce or generate a first one or more acoustic responses 122 and a first one or more tool waves 126 at a plurality of receivers. The amplitude of the first acoustic response of the first wave train reflects a combined contribution of the first one or more acoustic responses 122 associated with the first one or more casing waves 122 and the one or more tool waves 126. For a downhole tool 112 with a plurality of receivers, the first acoustic response amplitudes at the plurality of receivers reflect the interference associated with the one or more tool waves 126 and the one or more acoustic responses 122 associated with the one or more casing waves 122. This phenomenon can be described by using a simplified and accurate wave interference model. The first acoustic response of a first wave of the first wave train can be expressed in the complex-number mode as:

$$WAV = AMP \exp(-iANG) \qquad \text{Equation 2,}$$

where WAV is the complex number, AMP is the amplitude of the first wave of the first wave train (the first acoustic response 122), for example, absolute of the complex number, and ANG is the phase angle of the first wave of the first wave train. The AMP can be determined from the amplitude of the first break or peak of the first acoustic response 122. The ANG can be determined from the travel time of the first break, for example, the arrival time of the peak/valley value of the first break of the first acoustic response 122. The ANG can be expressed as:

$$ANG = TT/f \qquad \text{Equation 3,}$$

where TT denotes the travel time of the first acoustic response 122 based on the location of the transmitter or source 113 and the receiver 123, and $f$ is the dominant frequency of the first break or peak of the first acoustic response 122. This complex-number wave mode can be employed to described the one or more casing waves 120, the one or more tool waves 126 and the first break or peak of the first acoustic response 122 that include both the one or more casing waves 120 and the one or more tool waves 126.

Specifically, at different receivers of the plurality of receivers, the one or more casing waves received can be expressed as:

$$WAV_{casing}^{Rn} = AMP_{casing}^{Rn} \exp(-iANG_{casing}^{Rn}) \qquad \text{Equation 4,}$$

the tool waves:

$$WAV_{tool}^{Rn} = AMP_{tool}^{Rn} \exp(-iANG_{tool}^{Rn}) \qquad \text{Equation 5, and}$$

the first acoustic response, $$WAV_{FE}^{Rn} = AMP_{FE}^{Rn} \exp(-iANG_{FE}^{Rn}) \qquad \text{Equation 6.}$$

In general, the first acoustic response or first acoustic response waves equal to the interference results of the one or more tool waves 126 and the one or more casing waves 120:

$$WAV_{FE}^{Rn} = WAV_{tool}^{Rn} + WAV_{casing}^{Rn} \qquad \text{Equation 7.}$$

For the above equations, $R_n$ represents the n-th receiver and FE represents the "first echo" or first acoustic response 122. The casing wave $WAV_{casing}^{Rn}$ and the tool wave $WAV_{tool}^{Rn}$ cannot be directly read from the downhole data or field data acquired by a downhole sonic logging tool, and only the first break or peak of the first acoustic response 122 can be measured ($WAV_{FE,meas}^{Rn}$). A tool wave at a first receiver of the plurality of receivers, $WAV_{tool}^{R1}$, the attenuation of the tool wave ATTN (in decibels per foot (dB/ft)) ($ATTN_{tool}^{R1 \sim Rn}$), and the casing wave slowness $s_{casing}^{R1 \sim Rn}$ are the feature of casing 106, and each can be measured before the downhole tool 112 is disposed or positioned at a depth in the borehole 102. Then, the casing waves at different receivers of the plurality of receivers, in the complex-number form, can be expressed as, $$WAV_{tool}^{Rn} = WAV_{tool}^{R1} \exp\{i2\pi s_{tool}^{R1 \sim Rn}[z(Rn)-z(R1)]\} * 10^{ATTN_{tool}^{R1 \sim Rn}[z(Rn)-z(R1)]/20} \qquad \text{Equation 8,}$$

where the term $\exp\{i2\pi s_{tool}^{R1 \sim Rn}[z(Rn)-z(R1)]\}$ represents phase changes, and the term $10^{ATTN_{tool}^{R1 \sim Rn}[z(Rn)-z(R1)]/20}$ represents the amplitude change of a tool wave. A casing wave amplitude can also be predicted if the casing wave attenuation rate is assumed to be between the first receiver R1 and the last receiver Rn (in decibels per foot or 3.28 decibels per meter), as $ATTN_{casing}^{R1 \sim Rn}$, and the tool wave slowness $s_{tool}^{R1 \sim Rn}$ are the feature of the downhole tool. Then, the one or more casing waves, at different receivers of the plurality of receivers, in the complex-number form, can be expressed as, $$WAV_{casing,model}^{Rn}(ATTN_{casing}^{R1 \sim Rn}) = WAV_{casing}^{0} \\ \exp\{i2\pi s_{casing}^{R1 \sim Rn}[z(Rn)]\} * \\ 10^{ATTN_{casing}^{R1 \sim Rn}[z(Rn)-z(R1)]/20 + ATTN_{casing}^{T-R1}[z(R1)]/20} \qquad \text{Equation 9,}$$

where $WAV_{casing}^{Rn}$ denotes the one or more casing wave arrivals at the position of the receiver $R_n$, $WAV_{casing}^{0}$ denotes the one or more casing wave arrivals at the zero offset of the source, $\exp\{i2\pi s_{casing}^{R1 \sim Rn}[z(Rn-R1)]\}$ represents the phase change of the arrival of the one or more casing waves, and the term $10^{ATTN_{casing}^{R1 \sim Rn}[z(Rn)-z(R1)]/20 + ATTN_{casing}^{T-R1}[z(R1)]/2}$ denotes the amplitude change of the arrival of the one or more casing waves. It is noted that the one or more casing wave arrivals $WAV_{casing}^{Rn}$ can be predicted from modeling, for example, by Equation 9, and calibrated by using free-casing data. During the logging procedures, $ATTN_{casing}^{T-R1}$ can be predicted from the amplitude logs that have been completed. Alternatively, we might assume the casing wave attenuation is the same between the transmitter to last receiver of the plurality of receivers, and use $ATTN_{casing}$ as the casing wave attenuation (in dB/ft), so Equation 9 above becomes:

$$WAV_{casing,model}^{Rn}(ATTN_{casing}) = WAV_{casing}^{0} \\ \exp\{i2\pi s_{casing}^{R1 \sim Rn}[z(Rn)]\} * 10^{ATTN_{casing}[z(Rn)]/20} \qquad \text{Equation 10.}$$

At step 205, the casing-tool wave interference model is used to predict a first one or more predicted or modeled acoustic response amplitudes, for example, an amplitude of the predicted first break or peak of the acoustic response, associated with the one or more acoustic responses 122 at a plurality of receivers at a first depth of the downhole tool 112. The first predicted amplitude may be predicted assuming one or more propagating factors, for example, the propagating speed and attenuation of the one or more casing waves 120. The speed may be calculated from forward modeling and thus the attenuation of one or more of the one or more casing waves 120 is the only unknown factor to be solved. For example, a numerical model may be built with the borehole parameter, a casing parameter or both. A numerical simulation method (for example, a finite difference method (FDM) or an RAI method) is employed to compute the simulated data with the casing wave slowness extracted from the simulated data.

Continuing on from the above equations, since both the casing wave and tool wave arrivals at different receivers of the plurality of receivers can be modeled, so the first predicted acoustic response amplitude, in complex number form can be computed as $$WAV_{FE,model}^{Rn}(ATTN_{casing}) = WAV_{tool,model}^{Rn} + WAV_{casing,model}^{Rn}(ATTN_{casing})$$   Equation 11.

Often, in practice, in order to make the model data close to the measurement and eliminating unknown distraction, the modeled or predicted first acoustic response amplitude is normalized with the averaged amplitude and phase of the measured data the acoustic response 122, for example, $$WAV_{FE,model}^{Rn}(ATTN_{casing}) =$$   Equation 12

$$WAV_{FE,model}^{Rn}(ATTN_{casing}) \frac{\sum_{m=1\sim N}|WAV_{FE,meas}^{Rm}|}{\sum_{m=1\sim N}|WAV_{FE,model}^{Rm}|}$$

$$\exp\left[i\frac{\sum_{m=1\sim N}|ANG_{FE,meas}^{Rm}| - \sum_{m=1\sim N}|ANG_{FE,model}^{Rm}|}{N}\right],$$

where ANG denotes the signal phase angle and $R_m$ represents the m-th receiver. The casing wave attenuation can be extracted by minimizing the difference between the modeled or predicted first acoustic response and the measured first acoustic response, for example, as shown in Equation 12:

$$O(ATTN_{casing}) = \|WAV_{FE,model}^{Rn}(ATTN_{casing}) - WAV_{FE,meas}^{Rn}\|$$   Equation 13, where $O(ATTN_{casing})$ is the casing wave attenuation, $WAV_{FE,\,model}^{Rn}$ represents the first echo signal or the first acoustic response wave from the forward modeling, and $WAV_{FE,\,meas}^{Rn}$, represents the first echo signal or the first acoustic response wave from the measurement. Usually, because the slowness of the casing waves and tool waves are very close to each other, we may optionally ignore the item of phase change in Equations 9-13. Then the misfit function of Equation 13 becomes a simplified wave amplitude interference. For quality control purpose, the misfit function of Equation 13 might be normalized to between 0 and 1 by, $$QC(ATTN_{casing}) = \frac{\min[O(ATTN_{casing})]}{O(ATTN_{casing})},$$   Equation 14 where $QC(ATTN_{casing})$ represents the normalized casing wave attenuation and where large values of $QC(ATTN_{casing})$ represent low values of misfit between measurement and modeling and further suggest the possible solutions in Equation 13.

At step 208, an inversion to minimize the objective function in Equation 13 is performed to decrease the misfit between the one or more measured acoustic responses and the one or more predicted acoustic responses, for example the one or more predicted acoustic response amplitudes (for example, using Equations 11 and 12) from the casing-tool wave interference model of steps 203 and 205. The only unknown to be determined is the attenuation of the one or more casing waves 120.

At step 210, the casing to full wave amplitude ratio, the casing wave attenuation value minimizing the misfit between the one or more measured acoustic responses and the one or more predicted acoustic responses, or both are determined based on the inversion from step 208 and one or more tool wave amplitude constraints of step 211, for example, as discussed with respect to Equation 18. In one or more embodiments, if $ATTN_{casing}$ is estimated, $WAV_{casing,\,model}^{Rn}(ATTN_{casing})$ may be calculated with Equation 9, then the casing to full wave amplitude ratio, R, is:

$$R = \frac{|WAV_{casing,model}^{Rn}(ATTN_{casing})|}{|WAV_{FE,meas}^{Rn}|},$$   Equation 15 where $ATTN_{casing}$ is the estimated attenuation in dB and $WAV_{casing,\,model}^{Rn}(ATTN_{casing})$ is the estimated amplitude in units convertible to dB. The BI is calculated from the estimated amplitude/attenuation in dB calibrated by the free casing amplitude/attenuation and 100% bond amplitude/attenuation of:

$$BI = \frac{dB(x) - dB_{freePipe}}{dB_{100\%bond} - dB_{freePipe}},$$   Equation 16 where $dB(x)$ is the current amplitude/attenuation, $dB_{freePipe}$ and $dB_{100\%bond}$ bond are assuming material behind the casing the casing fully are mud or cement, respectively. A BI value of 1.0 represents a perfect cement-bond. A value of less than 1.0 is indicative of an incomplete cement-bond.

At step 212, the BI is calculated based at least in part, on the ratio of the casing wave amplitude and the predicted acoustic response amplitude, the casing wave attenuation value minimizing the misfit, or both, input modeling information of step 213, input free-casing information, and any combination thereof. For example, assuming a BI of from 0 and 1, with the input of the borehole parameter, casing parameter, or both, the response of the one or more casing waves (amplitude and phase) may be obtained by forward modeling. The forward modeling may be a numerical simulation with an RAI method or a finite-difference-time-domain method. In one or more embodiments, the input modeling information may comprise the relationship between a casing wave amplitude, casing wave attenuation, casing wave phase and any combination thereof in determining the BI.

The processing of the information received at the one or more of the one or more receivers 123, the receiver array 124 and any combination thereof is very sensitive to the balance of a receiver with different offsets or positions wherein an offset is a distance between a transmitter and a receiver. Thus, to get balanced data, a response of any receiver of the downhole tool might be first measured in a free-casing zone to calculate the gains of the receiver and to employ for compensating the inconsistency of any one or more receivers before performing any one or more steps of flowchart 200 for CBL processing.

The one or more steps of flowchart 200 utilize data or information received at different receivers by applying a casing-tool wave interference model. This process provides a more robust BI calculation than traditional single-receiver amplitude-based processing, especially for the zones with larger BI, where the casing wave arrival is much weaker than the tool wave arrival. The dependency of the CBL processing on the accuracy of tool wave estimation is reduced to provide a real-time downhole processing of the data or information received at the plurality of receivers and, given that the raw data received at the plurality of receiver is invisible to an end user, human interaction is minimized.

Figure 3:
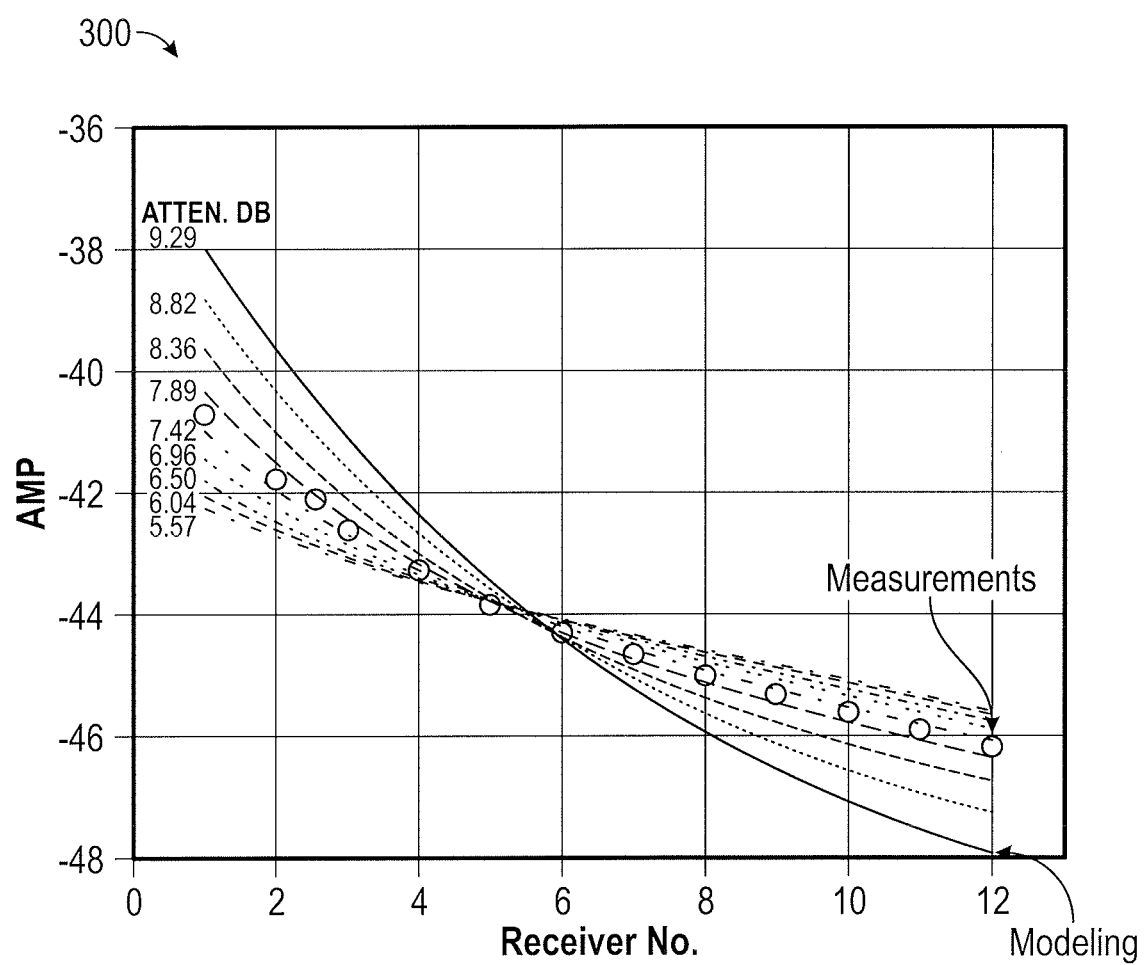
FIG. 3 depicts a comparison between measurements and modeling data at different receivers of a plurality of receivers, in accordance with one or more aspects of the present disclosure.

FIG. 3 illustrates a comparison 300 between measurements, raw data, for example, the one or more acoustic responses or the amplitude of the one or more acoustic responses, received at the plurality of receivers and modeling data, for example, the model predicted amplitude determined by Equations 11 and 12, at different receivers of a plurality of receivers, according to one or more aspects of the present disclosure. An example for predicting wave interference between the one or more tool waves 126 and the one or more casing waves 120 of the first one or more acoustic response 122, where the amplitude (in dB) at different receivers of the plurality of receivers for modeling and measurements are plotted.

The measurements received at the one or more receivers, for example, as one or more acoustic responses 122, represented by circles in FIG. 3, are generated from a model with a casing wave attenuation in this example of 7.43 dB/ft. The solid curves are modeling data as provided by Equations 11 and 12 assuming the amplitude of the tool wave as an input to the casing-tool wave interference model having 15% error, and the casing wave is −13 dB smaller than the one or more tool waves. For example, the solid curves of FIG. 3 are computed using simplified casing tool wave interference model by assuming 15% error in the amplitude of the input wave. Also, the phase change information in the casing-tool wave interference model is neglected. FIG. 3 suggests the input error of tool waves does not strongly reflect the effectiveness of the Equations 11 and 12 in solving casing wave attenuation, though in the signals the tool waves are much stronger than the arriving casing waves. The best fit of the casing-tool wave interference model to the simplified amplitude measurement, the amplitude of the first acoustic response 122 and represented by the circles in FIG. 3, is around 7.42 dB/ft, consistent with the input value of 7.43 dB/ft. This is a synthetic data validation of the processing method.

Figure 4:
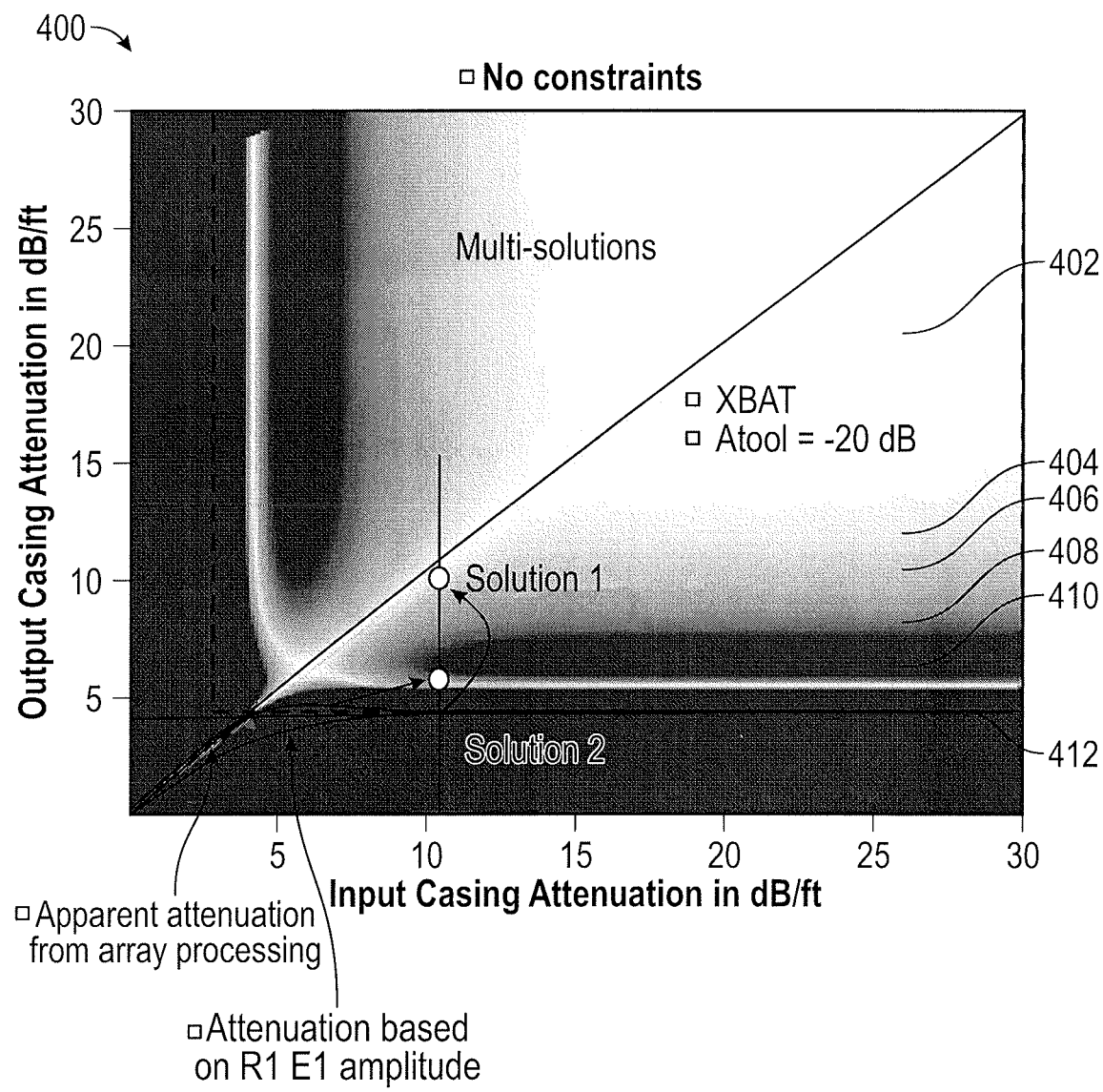
FIG. 4 depicts a plot of an objective function, in accordance with one or more aspects of the present disclosure.

FIG. 4 illustrates a plot 400 of an objective function for different cases with different case attenuation of casing 106 according to one or more aspects of the present disclosure. The objective function of Equation 13 may create multi-solutions for some cases as the changes of apparent attenuation at the one or more receivers 123 or the array of receivers 124 versus casing wave attenuation (or BI) is not monotonical. For example, as illustrated in FIG. 4, for a model with a given casing attenuation of 10.5 dB/ft, there are two solutions (labelled as Solution 1 and Solution 2) in the objective function, denoted by light colors of the objective function. Solution 1 represents the true or accurate solution while Solution 2 is an incorrect solution for the model. If the user selects Solution 2 as the final results, an incorrect interpretation may be obtained for the bonding condition behind casing. FIG. 4 illustrates an example of objective function where the tool wave amplitude is about −20 dB/ft with respect to the casing wave (of a free-casing case) at the first receiver, and the tool wave attenuation at the receiver section (the location on the downhole tool where the one or more receiver 123 or receiver array 124 is positioned or disposed), is about 3.5 dB/ft. The amplitude value of the first acoustic response 122 obtained from the amplitude-based method is converted into attenuation (divided by the transmitter-receiver offset, the distance between a transmitter or source 116 and a receiver 123 or receiver array 124) for visual comparison. In the plot 400, the section identified by 402 represents possible solutions of Equation 13 for different input casing wave attenuation values. It is observed that when the input casing wave attenuation is larger than the apparent tool wave attenuation indicated by the dashed line 412, the objective function will produce multiple solutions, for example, multiple non-unique solutions, denoted by the opaque white circles. These multiple solutions may cause incorrect interpretation of the data if the wrong solution is chosen. Typically, to overcome the multiple solution issue, a combined approach that uses both the amplitude based approach and the attenuation processing may be performed. However, such approaches may struggle in determining the balance between the amplitude based approach and the attenuation processing. In one or more embodiments, the use of tool wave amplitude constraints from the inputs or tool wave information as discussed with respect to step 201 and step 211 in FIG. 2 to tackle the problem non-unique solution. First, a range is defined for the tool wave, $$|WAV_{tool} - WAV_{Ref}| < A_{Thr} \qquad \text{Equation 17,}$$

where $WAV_{Ref}$ represents input reference tool waves and $A_{Thr}$ represents the amplitude threshold for tool wave estimates. The input reference tool waves may comprise a priori information, for example, information from a test of a downhole sonic tool in a water tank where only the tool wave exists or information extracted from a well-bonded zones where the casing waves are very weak. From the inequality, two boundaries for the tool waves can be obtained, for example, $WAV_{Ref} + A_{Thr}$ and $WAV_{Ref} - A_{Thr}$. If neglecting the phase difference between tool waves and the casing wave arrivals, then the range of casing wave amplitude can be written as $$(|WAV_{FE,meas}^{R0}| - |WAV_{Ref}| - A_{Thr}, |WAV_{FE,meas}^{R0}| - |WAV_{Ref}| + A_{Thr}) \qquad \text{Equation 18.}$$

By changing the unit of the boundary values to dB and dividing this unit of the boundary values by the transmitter-receiver offset, the bound of the inversion in the form of casing wave attenuation may be obtained. Applying these tool wave amplitude constraints, the two boundaries from Equation 18, can limit the range of the tool waves, and thus makes the processing of the data or information received at the plurality of receivers more reliable.

Figure 5:
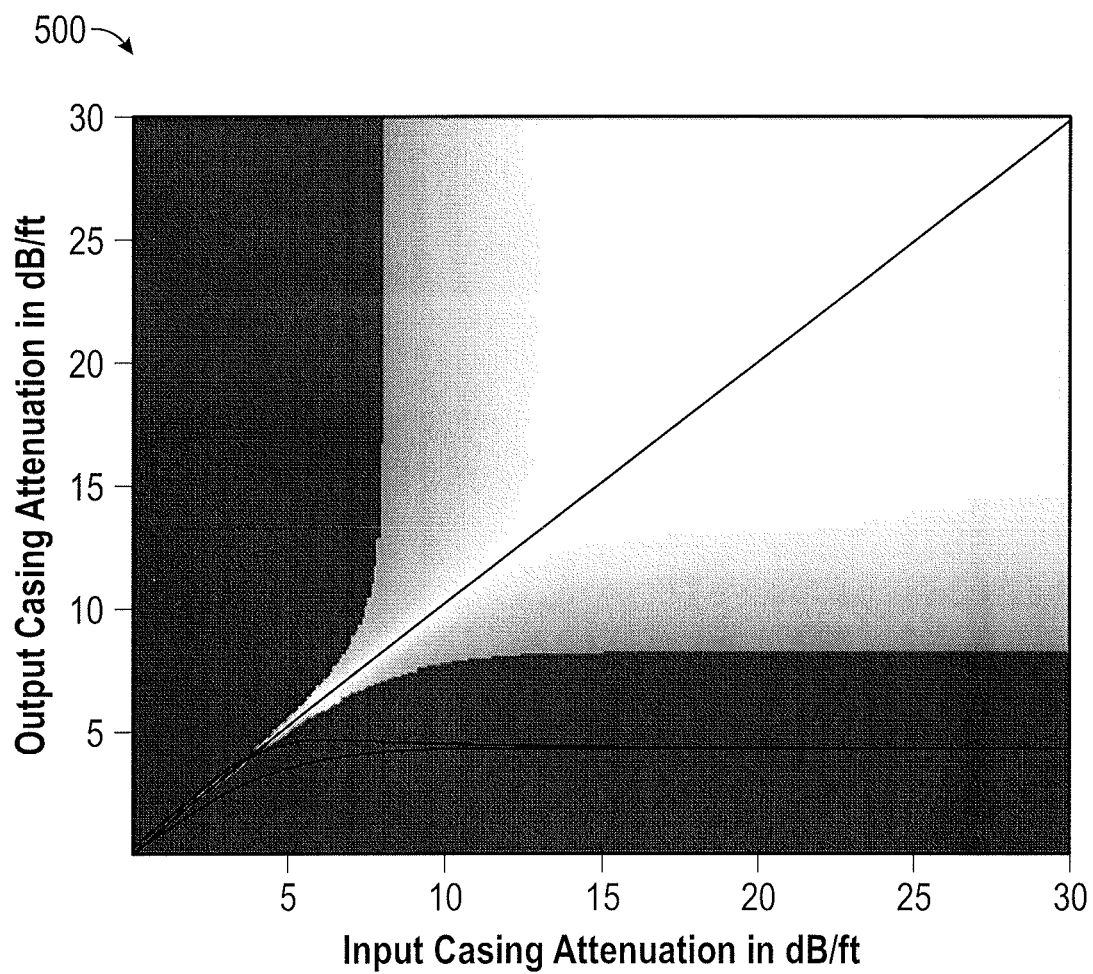
FIG. 5 depicts a plot of an objective function, in accordance with one or more aspects of the present disclosure.

FIG. 5 illustrates at 500 an objective function of the same case in FIG. 4 but imposes constraints on input tool waves by Equation 18. In one or more embodiments, the attenuation of casing waves in the amplitude at the first receiver is replaced with the equation:

$$AMP(R1) = (ATTN_{free-casing} - ATTN_{casing})z(R1) \qquad \text{Equation 19,}$$

where $z(R1)$ represents the transmitter-receiver offset of a receiver R1, for example a receiver 123, from a transmitter or source 116. Note that the AMPT(R1) is equivalent to the amplitude (in dB) normalized by the free casing wave amplitude.

Figure 6:
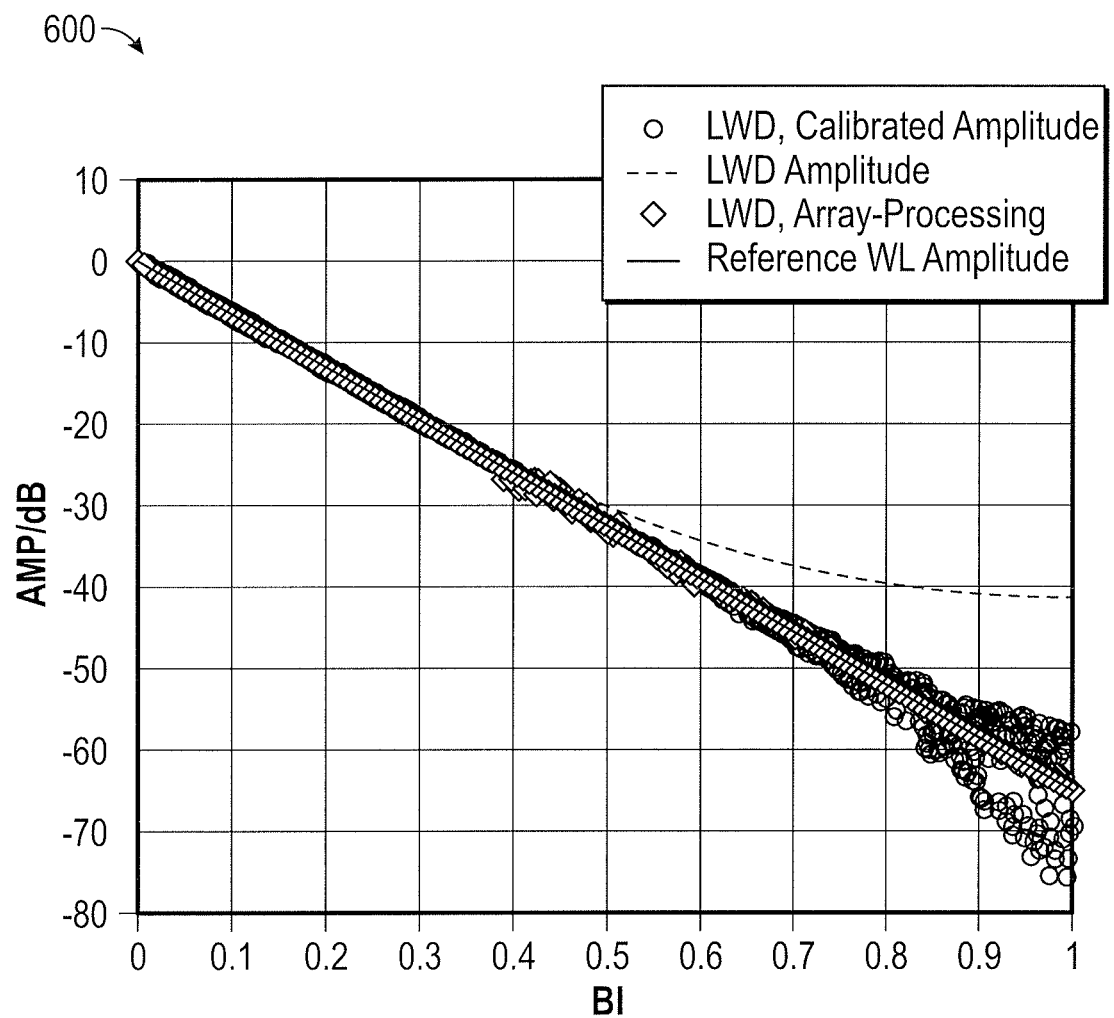
FIG. 6 depicts a plot for a random input tool amplitude error less than 10%, according to one or more aspects of the present disclosure.

FIG. 6 illustrates at 600 the comparison of the results between the amplitude-based single receiver processing with tool wave calibration in FIG. 3 and the array processing in FIG. 2, assuming the existence of random input tool amplitude error of tool waves where the tool wave amplitude is −40 dB to the casing wave amplitude in a free-casing case, according to one or more aspects of the present disclosure. Based on the distribution of the results of tool wave calibrated amplitude waves obtained from the LWD amplitude-based processing, it shows that the LWD amplitude-based method is very sensitive to tool wave amplitude, especially for the cases of larger BI, when the tool wave arrivals are much stronger than the casing wave arrivals. For example, a 10% error in tool amplitude might create around 12% error in the estimated casing amplitude in the case where BI is close to 1. In contrast, a 10% error in tool wave amplitude causes only 1.2% error in proposed processing of this disclosure. Therefore, the array-processing method seems to be more robust and is less influenced by the tool wave amplitude error.

FIGS. 7A and 7B illustrate the comparison between the results of the proposed inversion-based array processing and the amplitude-based single receiver processing for an input formation model, assuming a 15% error in the tool wave amplitude, according to one or more aspects of the present disclosure. Generally, the overall results show that the proposed array processing is less sensitive to input error in tool wave amplitude as compared to the amplitude-based processing. FIG. 7A shows a comparison of the waveform amplitude (AMP) among the reference wavelength (WL) AMP processing, the LWD calibrated AMP processing and the LWD array-processing. FIG. 7B shows a comparison of the BI among the reference BI obtained from WL AMP processing, LWD calibrated AMP processing and LWD array-processing.

Figure 8A:
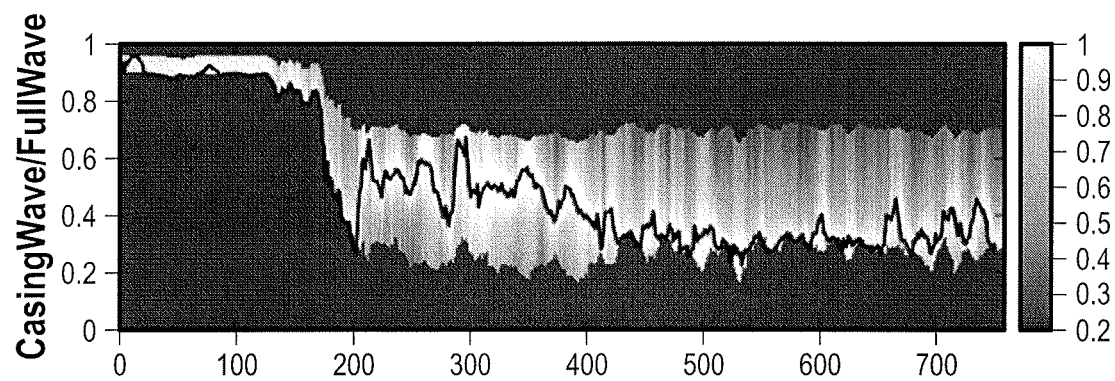
FIGS. 8A and 8B depict a comparison between the results obtained from a general amplitude method and the proposed array processing method, according to one or more aspects of the present disclosure.
Figure 8B:
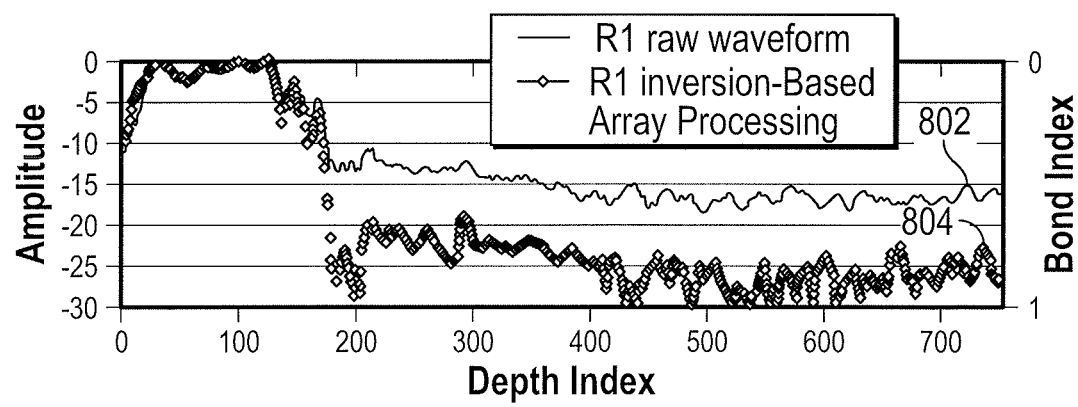

FIGS. 8A and 8B illustrates the comparison between the general amplitude method and proposed array processing method in processing field data. It suggests that the proposed inversion-based array processing method according to one or more aspects of the present disclosure can be deployed to evaluate the BI for well bond cases, thus extends the application range of the LWD sonic in cement evaluation. The general amplitude method is indicated as 802 and the proposed array processing method is indicated at 804. FIG. 8A shows the minimum solutions of LWD array processing at each depth where peak of brightest shading represents the estimates. FIG. 8B shows a comparison of the solutions between conventional amplitude processing and the present disclosure of LWD array processing. The BI results by the present disclosure of LWD array processing show BI index up to 1 which illustrates that the LWD array processing method of the present disclosure is acceptable for use in all cases. In contrast, BI results by the conventional approach (R1 raw waveform) can only reach a BI index of up to 0.55 which is not correctly estimated due to the influences of tool waves.

In one or more embodiments, any one or more steps or processes discussed herein may be performed in real-time. In one or more embodiments, any one or more steps or processes discussed herein are based on data or measurements stored in a memory. In one or more embodiments, any one or more steps or processes discussed herein may be performed in any order or not at all.

FIG. 9 is a diagram illustrating an example information handling system 900, for example, for use with or by an associated wellbore environment illustrated in FIGS. 1A-B, according to one or more aspects of the present disclosure. The information handling system 132 of FIGS. 1A-B may take a form similar to the information handling system 900. A processor or central processing unit (CPU) 901 of the information handling system 900 is communicatively coupled to a memory controller hub (MCH) or north bridge 902. The processor 901 may include, for example a microprocessor, microcontroller, digital signal processor (DSP), application specific integrated circuit (ASIC), or any other digital or analog circuitry configured to interpret and/or execute program instructions and/or process data. Processor 901 may be configured to interpret and/or execute program instructions or other data retrieved and stored in any memory such as memory 903 or hard drive 907. Program instructions or other data may constitute portions of a software or application, for example application 958 or data 954, for carrying out one or more methods described herein. Memory 903 may include read-only memory (ROM), random access memory (RAM), solid state memory, or disk-based memory. Each memory module may include any system, device or apparatus configured to retain program instructions and/or data for a period of time (for example, non-transitory computer-readable media). For example, instructions from a software program or application 958 or data 954 may be retrieved and stored in memory 903 for execution or use by processor 901. In one or more embodiments, the memory 903 or the hard drive 907 may include or comprise one or more non-transitory executable instructions that, when executed by the processor 901 cause the processor 901 to perform or initiate one or more operations or steps. The information handling system 900 may be preprogrammed or it may be programmed (and reprogrammed) by loading a program from another source (for example, from a CD-ROM, from another computer device through a data network, or in another manner).

The data 954 may include treatment data, geological data, fracture data, microseismic data, or any other appropriate data. The one or more applications 958 may include a fracture design model, a reservoir simulation tool, a fracture simulation model, or any other appropriate applications. In one or more embodiments, a memory of a computing device includes additional or different data, application, models, or other information. In one or more embodiments, the data 954 may include treatment data relating to fracture treatment plans. For example the treatment data may indicate a pumping schedule, parameters of a previous injection treatment, parameters of a future injection treatment, or one or more parameters of a proposed injection treatment. Such one or more parameters may include information on flow rates, flow volumes, slurry concentrations, fluid compositions, injection locations, injection times, or other parameters. The treatment data may include one or more treatment parameters that have been optimized or selected based on numerical simulations of complex fracture propagation. In one or more embodiments, the data 954 may include one or more signals received by one or more receivers 123 or receiver array 124 of FIGS. 1A-B, for example, data 954 may comprise processed data 138 or data 130 as discussed above with respect to FIGS. 1A-B.

The one or more applications 958 may comprise one or more software programs or applications, one or more scripts, one or more functions, one or more executables, or one or more other modules that are interpreted or executed by the processor 901. For example, the one or more applications 958 may include a fracture design module, a reservoir simulation tool, a hydraulic fracture simulation model, or any other appropriate function block. The one or more applications 958 may include machine-readable instructions for performing one or more of the operations related to any one or more embodiments of the present disclosure. The one or more applications 958 may include machine-readable instructions for generating a user interface or a plot, for example, illustrating fracture geometry (for example, length, width, spacing, orientation, etc.), pressure plot, hydrocarbon production performance. The one or more applications 958 may obtain input data, such as treatment data, geological data, fracture data, or other types of input data, from the memory 903, from another local source, or from one or more remote sources (for example, via the one or more communication links 914). The one or more applications 958 may generate output data and store the output data in the memory 903, hard drive 907, in another local medium, or in one or more remote devices (for example, by sending the output data via the communication link 914).

Modifications, additions, or omissions may be made to FIG. 9 without departing from the scope of the present disclosure. For example, FIG. 9 shows a particular configuration of components of information handling system 900. However, any suitable configurations of components may be used. For example, components of information handling system 900 may be implemented either as physical or logical components. Furthermore, in some embodiments, functionality associated with components of information handling system 900 may be implemented in special purpose circuits or components. In other embodiments, functionality associated with components of information handling system 900 may be implemented in configurable general purpose circuit or components. For example, components of information handling system 900 may be implemented by configured computer program instructions.

Memory controller hub 902 may include a memory controller for directing information to or from various system memory components within the information handling system 900, such as memory 903, storage element 906, and hard drive 907. The memory controller hub 902 may be coupled to memory 903 and a graphics processing unit (GPU) 904. Memory controller hub 902 may also be coupled to an I/O controller hub (ICH) or south bridge 905. I/O controller hub 905 is coupled to storage elements of the information handling system 900, including a storage element 906, which may comprise a flash ROM that includes a basic input/output system (BIOS) of the computer system. I/O controller hub 905 is also coupled to the hard drive 907 of the information handling system 900. I/O controller hub 905 may also be coupled to an I/O chip or interface, for example, a Super I/O chip 908, which is itself coupled to several of the I/O ports of the computer system, including a keyboard 909, a mouse 910, a monitor 912 and one or more communications link 914. Any one or more input/output devices receive and transmit data in analog or digital form over one or more communication links 914 such as a serial link, a wireless link (for example, infrared, radio frequency, or others), a parallel link, or another type of link. The one or more communication links 914 may comprise any type of communication channel, connector, data communication network, or other link. For example, the one or more communication links 914 may comprise a wireless or a wired network, a Local Area Network (LAN), a Wide Area Network (WAN), a private network, a public network (such as the Internet), a Wi-Fi network, a network that includes a satellite link, or another type of data communication network.

In one or more embodiments, a method for determining a bonding index of a casing in a borehole comprises generating one or more source signals from one or more transmitters, receiving one or more acoustic responses at a plurality of receivers of a downhole tool, wherein the one or more acoustic responses correspond to one or more of the one or more source signals from the one or more transmitters, determining a travel time for the one or more acoustic responses received at one or more of the plurality of receivers, determining one or more predicted acoustic response amplitudes associated with the one or more acoustic responses associated with a first receiver of the plurality of receivers using a casing-tool wave interference model, wherein the travel time, one or more casing waves and one or more tool waves are inputs to the casing-tool wave interference model, performing an inversion on the one or more predicted acoustic response amplitudes, determining a casing wave attenuation value that minimizes a misfit between the one or more acoustic responses and the one or more predicted acoustic responses based, at least in part, on the inversion and one or more tool wave amplitude constraints, and determining the bonding index based, at least in part, on the casing wave attenuation value. In one or more embodiments, determining the bonding index is further based, at least in part, on one or more of input free-casing information and input modeling information. In one or more embodiments, the input modeling information comprises a relationship between one or more of one or more amplitudes of at least one of the one or more casing waves, one or more attenuations of the at least one of the one or more casing waves, and one or more phases of the at least one of the one or more casing waves. In one or more embodiments, determining the boding index is further based, at least in part, on one or more attenuations of at least one of the one or more casing waves. In one or more embodiments, the inversion is further based, at least in part, on a predicted acoustic response amplitude at a second receiver of the plurality of receivers. In one or more embodiments, determining the bonding index is further based, at least in part, on a ratio of an amplitude of attenuation of at least of the one or more casing waves and at least one of the one or more predicted acoustic response amplitudes. In one or more embodiments, at least one amplitude of the one or more predicted acoustic response amplitudes is based, at least in part, on a normalized average amplitude and a phase of at least one of the one or more acoustic responses one or more transmitters. In one or more embodiments, a non-transitory computer readable medium storing one or more instructions that, when executed by at least one processor, cause the at least one processor to perform one or more operations of any one or more of the above steps.

In one or more embodiments a cement-bond evaluation system comprises a downhole tool comprising: one or more transmitters, wherein the one or more transmitters generate one or more source signals, a plurality of receivers, wherein the plurality of receivers receive one or more acoustic responses, wherein the one or more acoustic responses correspond to one or more source signals from the one or more transmitters and a downhole tool memory communicatively coupled to the plurality of receivers, wherein the downhole tool memory stores the one or more acoustic response received by the plurality of receivers, the cement-bond evaluation system further comprising an information handling system communicatively coupled to the downhole memory, the information handling system comprising a processor communicatively coupled to a non-transitory memory storing one or more instructions that, when executed by the process, cause the process to: determine a travel time for the one or more acoustic responses received at one or more of the plurality of receivers, determine one or more predicted acoustic response amplitudes associated with the one or more acoustic responses associated with a first receiver of the plurality of receivers using a casing-tool wave interference model, wherein the travel time, one or more casing waves and one or more tool waves are inputs to the casing-tool wave interference model, perform an inversion on the one or more predicted acoustic response amplitudes, determining a casing wave attenuation value that minimizes a misfit between the one or more acoustic responses and the one or more predicted acoustic responses based, at least in part, on the inversion and one or more tool wave amplitude constraints and determine the bonding index based, at least in part, on the casing wave attenuation value. In one or more embodiments, determining the bonding index is further based, at least in part, on one or more of input free-casing information and input modeling information. In one or more embodiments, the input modeling information comprises a relationship between one or more of one or more amplitudes of at least one of the one or more casing waves, one or more attenuations of the at least one of the one or more casing waves, and one or more phases of the at least one of the one or more casing waves. In one or more embodiments, determining the bonding index is further based, at least in part, on one or more attenuations of at least one of the one or more casing waves. In one or more embodiments, the inversion is further based, at least in part, on a predicted acoustic response amplitude at a second receiver of the plurality of receivers. In one or more embodiments, determining the bonding index is further based, at least in part, on a ratio of an amplitude of attenuation of at least one of the one or more casing waves and at least one of the one or more acoustic response amplitudes. In one or more embodiments, at least one amplitude of the one or more predicted acoustic response amplitudes is based, at least in part, on a normalized average amplitude and a phase of at least one acoustic response of the one or more acoustic responses.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (for example, "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method for determining a bonding index of a casing in a borehole comprising:
    generating one or more source signals from one or more transmitters;
    receiving one or more acoustic responses at a plurality of receivers of a downhole tool, wherein the one or more acoustic responses correspond to one or more of the one or more source signals from the one or more transmitters;
    determining a travel time for the one or more acoustic responses received at one or more of the plurality of receivers;
    determining one or more predicted acoustic response amplitudes associated with the one or more acoustic responses associated with a first receiver of the plurality of receivers using a casing-tool wave interference model, wherein the travel time, one or more casing waves and one or more tool waves are inputs to the casing-tool wave interference model;
    performing an inversion on the one or more predicted acoustic response amplitudes;
    determining a casing wave attenuation value that minimizes a misfit between the one or more acoustic responses and the one or more predicted acoustic responses based, at least in part, on the inversion and one or more tool wave amplitude constraints; and
    determining the bonding index based, at least in part, on the casing wave attenuation value.

2. The method of claim 1, wherein determining the bonding index is further based, at least in part, on one or more of input free-casing information and input modeling information.

3. The method of claim 2, wherein the input modeling information comprises a relationship between one or more of one or more amplitudes of at least one of the one or more casing waves, one or more attenuations of the at least one of the one or more casing waves, and one or more phases of the at least one of the one or more casing waves.

4. The method of claim 1, wherein determining the bonding index is further based, at least in part, on one or more attenuations of at least one of the one or more casing waves.

5. The method of claim 1, wherein the inversion is further based, at least in part, on a predicted acoustic response amplitude at a second receiver of the plurality of receivers.

6. The method of claim 1, wherein determining the bonding index is further based, at least in part, on a ratio of an amplitude of attenuation of at least of the one or more casing waves and at least one of the one or more predicted acoustic response amplitudes.

7. The method of claim 1, wherein at least one amplitude of the one or more predicted acoustic response amplitudes is based, at least in part, on a normalized average amplitude and a phase of at least one of the one or more acoustic responses.

8. A cement-bond evaluation system, comprising:
    a downhole tool comprising:
        one or more transmitters, wherein the one or more transmitters generate one or more source signals;
        a plurality of receivers, wherein the plurality of receivers receive one or more acoustic responses, wherein the one or more acoustic responses correspond to one or more source signals from the one or more transmitters; and
        a downhole tool memory communicatively coupled to the plurality of receivers,
    wherein the downhole tool memory stores the one or more acoustic response received by the plurality of receivers; and
    an information handling system communicatively coupled to the downhole memory, the information handling system comprising a processor communicatively coupled to a non-transitory memory storing one or more instructions that, when executed by the process, cause the process to:

determine a travel time for the one or more acoustic responses received at one or more of the plurality of receivers;

determine one or more predicted acoustic response amplitudes associated with the one or more acoustic responses associated with a first receiver of the plurality of receivers using a casing-tool wave interference model, wherein the travel time, one or more casing waves and one or more tool waves are inputs to the casing-tool wave interference model;

perform an inversion on the one or more predicted acoustic response amplitudes;

determining a casing wave attenuation value that minimizes a misfit between the one or more acoustic responses and the one or more predicted acoustic responses based, at least in part, on the inversion and one or more tool wave amplitude constraints; and determine the bonding index based, at least in part, on the casing wave attenuation value.

9. The cement-bond evaluation system of claim 8, wherein determining the bonding index is further based, at least in part, on one or more of input free-casing information and input modeling information.

10. The cement-bond evaluation system of claim 9, wherein the input modeling information comprises a relationship between one or more of one or more amplitudes of at least one of the one or more casing waves, one or more attenuations of the at least one of the one or more casing waves, and one or more phases of the at least one of the one or more casing waves.

11. The cement-bond evaluation system of claim 8, wherein determining the bonding index is further based, at least in part, on one or more attenuations of at least one of the one or more casing waves.

12. The cement-bond evaluation system of claim 8, wherein the inversion is further based, at least in part, on a predicted acoustic response amplitude at a second receiver of the plurality of receivers.

13. The cement-bond evaluation system of claim 8, wherein determining the bonding index is further based, at least in part, on a ratio of an amplitude of attenuation of at least one of the one or more casing waves and at least one of the one or more acoustic response amplitudes.

14. The cement-bond evaluation system of claim 8, wherein at least one amplitude of the one or more predicted acoustic response amplitudes is based, at least in part, on a normalized average amplitude and a phase of at least one acoustic response of the one or more acoustic responses.

15. A non-transitory computer readable medium storing one or more instructions that, when executed by at least one processor, cause the at least one processor to perform one or more operations comprising:

generating one or more source signals from one or more transmitters;

receiving one or more acoustic responses at a plurality of receivers of a downhole tool, wherein the one or more acoustic responses correspond to one or more of the one or more source signals from the one or more transmitters;

determining a travel time for the one or more acoustic responses received at one or more of the plurality of receivers;

determining one or more predicted acoustic response amplitudes associated with the one or more acoustic responses associated with a first receiver of the plurality of receivers using a casing-tool wave interference model, wherein the travel time, one or more casing waves and one or more tool waves are inputs to the casing-tool wave interference model;

performing an inversion on the one or more predicted acoustic response amplitudes;

determining a casing wave attenuation value that minimizes a misfit between the one or more acoustic responses and the one or more predicted acoustic responses based, at least in part, on the inversion and one or more tool wave amplitude constraints; and determining the bonding index based, at least in part, on the casing wave attenuation value.

16. The non-transitory computer readable medium of claim 15, wherein determining the bonding index is further based, at least in part, on one or more of input free-casing information and input modeling information.

17. The non-transitory computer readable medium of claim 16, wherein the input modeling information comprises a relationship between one or more of one or more amplitudes of at least one of the one or more casing waves, one or more attenuations of the at least one of the one or more casing waves, and one or more phases of the at least one of the one or more casing waves.

18. The non-transitory computer readable medium of claim 15, wherein determining the bonding index is further based, at least in part, on one or more attenuations of at least one of the one or more casing waves.

19. The non-transitory computer readable medium of claim 15, wherein the inversion is further based, at least in part, on a predicted acoustic response amplitude at a second receiver of the plurality of receivers.

20. The non-transitory computer readable medium of claim 15, wherein one or more of:

determining the bonding index is further based, at least in part, on a ratio of an amplitude of attenuation of at least one of the one or more casing waves and at least one of the one or more acoustic response amplitudes; and at least one amplitude of the one or more predicted acoustic response amplitudes is based, at least in part, on a normalized average amplitude and a phase of at least one acoustic response of the one or more acoustic responses.

* * * * *